W. M. McCOY.
MINE CAR WHEEL.
APPLICATION FILED JULY 3, 1913.

1,081,318.   Patented Dec. 16, 1913.

WITNESSES:
R. D. Johnston
Nomie Welsh

INVENTOR
WALTER MORTON McCOY
BY
ATTORNEY

UNITED STATES PATENT OFFICE.

WALTER MORTON McCOY, OF BIRMINGHAM, ALABAMA, ASSIGNOR TO CHARLES ELLIS FOUST, OF BIRMINGHAM, ALABAMA.

MINE-CAR WHEEL.

1,081,318.  Specification of Letters Patent. Patented Dec. 16, 1913.

Application filed July 3, 1913. Serial No. 777,350.

*To all whom it may concern:*

Be it known that I, WALTER MORTON McCoy, a citizen of the United States of America, residing at Birmingham, in the county of Jefferson and State of Alabama, have invented certain new and useful Improvements in Mine-Car Wheels, of which the following is a specification.

My invention relates to certain new and useful improvements in mine car wheels, having as its object to simplify and perfect a means for retaining the wheel in running position on the axle.

My invention contemplates the provision of an extension on the inner end of the hub which is circumferentially shouldered and adapted to run in a boxing in which I mount cylindrical pins which are free to turn in radial seats and which are reversible and readily removable so as to afford a wheel retaining means having a maximum life and a minimum friction.

My invention comprises the details of construction and arrangement of parts which, in their preferred embodiment, are hereinafter more particularly described and claimed, reference being had to the accompanying drawings which form a part of the specification, and in which:—

Figure 1:
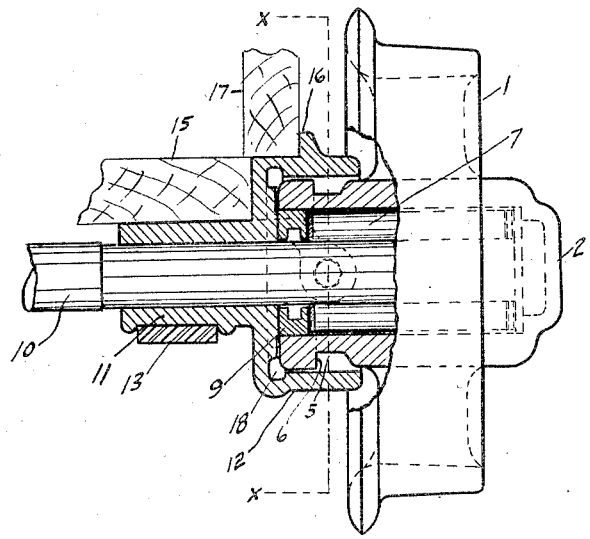
Figure 2:
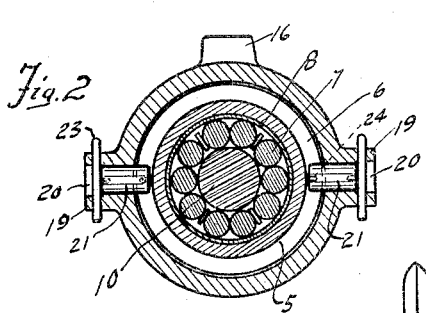
Figure 3:
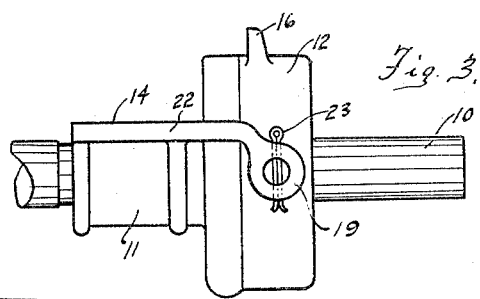
Figure 4:
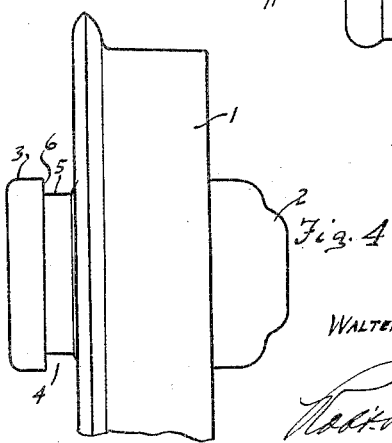

Figure 1 is a vertical sectional elevation through the hub and boxing of my improved wheel. Fig. 2 is a cross section on the line *x—x* of Fig. 1. Fig. 3 is a side elevation of the boxing and axle with the wheel removed. Fig. 4 is a side elevation of the wheel partly broken away.

Similar reference numerals refer to similar parts throughout the drawings.

The wheel 1, as illustrated, is of the ordinary mine car type, having the outer end 2 of its hub closed and having the inner end 3 of its hub extended a substantial distance beyond the inner side face of the wheel and provided with a circumferential groove or channel 4, which has a bottom wall 5 and, at its outer end, a vertical annular shoulder or bearing face 6 which stands parallel with the wheel. The hub is bored in the usual manner and provided with antifriction bearing 7 and a jacket 8, the bearings being held in place at the inner open end of the hub by a packing ring 9.

I provide a suitable boxing to receive the wheel axle 10, which boxing as shown is formed in an integral structure provided with an inner bearing portion 11 for the axle and an enlarged circular head portion 12 which has a hub receiving chamber open at its outer end and through the center of which projects the axle 10. The chamber in the end 12 of the boxing is adapted to receive the grooved portion of the wheel hub as shown in Fig. 1, the outer end of the boxing overlapping the outer end of the groove 4 and making a close running fit with the hub to keep dirt from working into the groove. The bearing portion 11 of the boxing has its upper flattened face 14 fastened securely to the underbody of the car 15 by a strap 13. The car body is cut away to receive the top portion of the boxing head 12 which has a top flange 16 that engages the side 17 of the car body. The head 12 is grooved out at 18 to form a circumferential packing chamber and in like manner the ring 9 is internally grooved to receive the packing so that two packings are provided against the leakage of lubricant from the bearing through the open end of the boxing.

The main object of my invention is to provide a fastening means which is carried by the boxing and which will work in the groove 4 so as to hold the wheel in running position on the axle. I have conceived that this can be done in the simplest and most effective manner by providing the head 12 of the boxing with a number of bosses 19 and boring through each of these bosses a radial circular opening 20 which is adapted to receive a short cylindrical steel bearing pin 21. The pins are adapted to project into the groove 4 and into the path of the outer wall or bearing face 6 of the hub and hold the wheel against disengagement from the boxing, *i. e.*, in running position on the axle. As a preferred arrangement these bosses are formed as a continuation of the flange 22 along the upper edge of the section 11 of the boxing and the bosses are diametrically oppositely arranged at the sides of the boxing. Cotter pin holes are drilled through the outer ends of the bosses and cotter pins 23 are adapted to be inserted through said holes so as to loosely hold the pins in operating position. As stated, there may be any number of these bosses and any desired number of pins used, but I prefer the arrangement shown inasmuch as the pins are supported in the openings 20 and there is no special wear at their ends.

The advantage of using the loose radial pins is that the pins are free to turn about radial axes so that they present new bearing surfaces to the wheel hub shoulder and wear evenly. As the pins, when in engagement with shoulder 6 will turn, the frictional wear on the retaining means and on the hub shoulder is reduced to a minimum. These pins are cylindrical and when one end is worn they may be reversed and the other end used, whereby the maximum life of the pin is obtained. To facilitate the removal of the pins they are provided at each end with sockets 24 which are adapted to receive an instrument, by means of which the pins can be withdrawn from the seats. By making the boxing solid and not in sections, the tendency of the oil to leak from the bearing is minimized. The removal of the wheel is an exceedingly simple operation, it being only necessary to knock out the two cotter pins 23 and draw the pins 21 outwardly until they clear the hub.

The construction of the wheel may be variously modified, it being only essential that the inner end of the wheel hub shall have an annular shoulder or face equivalent to 6 into the path of which the retaining pins can be projected.

What I claim as new and desire to secure by Letters Patent, is:—

1. The combination of a wheel having the inner end of its hub provided with an external circumferential shoulder, a boxing connected to a car, an axle passing through said boxing and wheel hub, the shouldered portion of said hub being adapted to rotate in the boxing which is circumferentially recessed to receive it, and a plurality of radially disposed circular pins which are rotatably and detachably mounted in said boxing with their inner ends projecting into the path of outward movement of said shoulder on the hub when the latter is in running position and which are adapted to hold the wheel in running position on the axle, substantially as described.

2. The combination with a wheel having the inner end of its hub provided with a circumferential shoulder having an outwardly facing annular wall which stands parallel with the wheel, a boxing which is recessed to receive the shouldered end of the hub, an axle, means to hold the wheel in running position on said axle comprising diametrically opposite circular pin seats which are bored radially through the sides of the boxing, circular steel pins which are loosely mounted for rotation in said seats, and detachable retaining means which hold the inner ends of said pins disposed in the path of outward movement of said shoulder when the wheel is in running position, substantially as described.

3. In combination, an integral boxing having a circular open ended chamber at one end, an axle in said boxing and projecting through and beyond said chamber, a wheel having a hub closed at its outer end and mounted on said axle, the inner end of the hub being provided with a circumferential offset shoulder which turns with a close running fit in said chamber in the boxing which has radial circular openings bored therethrough, circular reversible retaining pins mounted for rotation in said openings in the boxing, and means to detachably hold said pins with their inner ends projecting into said chamber in position to engage said shoulder as it tends to move outwardly and hold the wheel in running position on said axle.

4. In combination, a wheel having the inner end of its hub grooved to form an outwardly facing shoulder, a boxing into which said grooved end of the wheel hub projects with a close running fit, and an axle upon which said hub is mounted, said boxing having radial circular openings bored therethrough, circular pins inserted in said openings and adapted at each end to be engaged by a tool for withdrawing them from said openings, and detachable retaining means which loosely hold said pins free for rotation in the boxing with their inner ends projecting into the path of outward movement of said shoulder on the wheel hub, substantially as described.

5. In combination, an integral boxing having an outwardly opening cylindrical chamber, a wheel having its inner end provided with a shoulder and adapted to make a close running fit in said chamber, an axle on which the wheel is mounted, an annular packing gland arranged at the inner end of said chamber, and radial retaining pins detachably mounted for rotation in said boxing and having their inner ends projecting into the path of outward movement of said shoulder on the wheel hub, substantially as described.

In testimony whereof I affix my signature in presence of two witnesses.

WALTER MORTON McCOY.

Witnesses:
C. E. FOUST,
NOMIE WELSH.